United States Patent
Miyamoto et al.

(10) Patent No.: US 7,291,941 B2
(45) Date of Patent: Nov. 6, 2007

(54) TANDEM ARRANGEMENT LINEAR MOTOR

(75) Inventors: Yasuhiro Miyamoto, Fukuoka (JP); Takahisa Yamada, Fukuoka (JP)

(73) Assignee: Kabushiki Kaisha Yasakawa Denki, Fukuoka (JP)

( * ) Notice: Subject to any disclaimer, the term of this patent is extended or adjusted under 35 U.S.C. 154(b) by 0 days.

(21) Appl. No.: 10/530,674

(22) PCT Filed: Oct. 6, 2003

(86) PCT No.: PCT/JP03/12797

§ 371 (c)(1),
(2), (4) Date: Apr. 8, 2005

(87) PCT Pub. No.: WO2004/034556

PCT Pub. Date: Apr. 22, 2004

(65) Prior Publication Data

US 2005/0280315 A1    Dec. 22, 2005

(30) Foreign Application Priority Data

Oct. 8, 2002    (JP) .............................. 2002-295049

(51) Int. Cl.
H02K 41/02    (2006.01)
H02K 41/03    (2006.01)

(52) U.S. Cl. .............................. 310/12; 310/13; 310/14

(58) Field of Classification Search .................. 310/12, 310/13, 14
See application file for complete search history.

(56) References Cited

U.S. PATENT DOCUMENTS

| 4,958,115 | A  | * | 9/1990 | Miller ........................ 318/662 |
| 6,476,524 | B1 | * | 11/2002 | Miyamoto et al. ............ 310/12 |
| 6,592,254 | B2 | * | 7/2003 | Gul ............................ 374/148 |
| 6,750,576 | B2 | * | 6/2004 | Ehrhart et al. ............ 310/68 R |
| 2001/0010433 | A1 | * | 8/2001 | Watanabe .................... 310/12 |

FOREIGN PATENT DOCUMENTS

| JP | 2000-308328 A | 11/2000 |
| JP | 2002-136096 A | 5/2002 |
| JP | 2002-171741 A | 6/2002 |
| WO | WO 99/41825 A1 | 8/1999 |
| WO | WO 200163720 A1 * | 8/2001 |

\* cited by examiner

Primary Examiner—Tran Nguyen
(74) Attorney, Agent, or Firm—Sughrue Mion Pllc.

(57) ABSTRACT

A linear motor including a plurality of movers (1a to 1c), each of which is formed with an armature having a polyphase balancing winding (Ru to Rw), and a stator having a permanent magnet or a secondary conductor is configured such that the plurality of movers (1a to 1c) are disposed on the single stator; and the polyphase balancing windings (Ru to Rw) in the respective movers (1a to 1c) are connected in series. Accordingly, there can be obtained an inexpensive linear motor which is capable of driving a large machine, which is capable of canceling cogging force, which offers facilitated assembly of movers, and which can provide thermal protection of the movers with ease.

3 Claims, 6 Drawing Sheets

TANDEM ARRANGEMENT LINEAR MOTOR

TECHNICAL FIELD

The present invention relates to a serial configuration linear motor which, thanks for having a driving structure consisting of a plurality of linear movers, facilitates handling in the course of assembly; which can cancel cogging force; and which can provide thermal protection of the movers.

RELATED ART

FIG. 6 shows a related-art linear motor.

In the drawing, reference numeral 1' denotes a mover of the related-art linear motor constituted of a single armature; and reference numeral 6' denotes a stator constituted of a magnetic field originating from a plurality of permanent magnets. Meanwhile, the armature has a polyphase balancing winding. The linear motor is configured such that the mover 1' and the stator 6' face each other with a gap therebetween.

As shown in FIG. 6, the related-art linear motor has such a mechanism that a single moving member is driven by a single linear motor mover 1' (see, e.g., JP-A-2000-308328.

More specifically, the related-art linear motor is configured as follows for the purpose of facilitating connection with regard to crossover lines and neutral points of the armature coils, and increasing thrust per unit volume of a core block. That is, the linear motor includes an armature which faces permanent magnets for forming the magnetic field, with a magnetic gap therebetween. The armature is formed from core blocks divided into a plurality of pieces in the thrust direction, and an armature coil. The armature coil, which is wound around each of the core blocks, is configured such that a start-of-winding portion and an end-of-winding of the armature conductor are connected to a wiring substrate that has a wiring pattern.

However, even the above-mentioned linear motor that can increase thrust has a limit.

In consideration of a case where a linear motor is employed for driving a large machine tool or the like, required thrust for some machine tools is as high as 40,000 N. In this case, magnetic attraction between magnets and a core is as high as 12,000 N (12 t). However, in an attempt to obtain the required thrust by means of the linear motor as shown in FIG. 6 provided with a single armature, an increase in thrust or heat development by the armature gives rise to a problem of cogging, whereby the linear motor sometimes fails to drive such large machines.

If, a linear motor is designed on an assumption of including a single armature, a mover (armature) weighs 250 kg or more, thereby exacerbating a handling problem, and like problems. In addition, increase in the attractive force of magnets in the motor leads to a problem that assembly of magnets becomes time-consuming.

Furthermore, in a case of failure, cost incurred by damage also increases.

The present invention has been conceived to solve the above problem, and aims at providing an inexpensive, serial configuration linear motor which is capable of driving a large machine, is capable of canceling cogging force, offers facilitated assembly of movers, and is capable of providing thermal protection of the movers with ease.

DISCLOSURE OF THE INVENTION

To solve the above problem, the invention is related to a serial configuration linear motor that is constituted of a plurality of movers, each of which is formed from an armature having a polyphase balancing winding, and a stator having a permanent magnet or a secondary conductor. The linear motor is characterized in that the plurality of movers are disposed on the single stator so as to face each other with a gap therebetween; and the polyphase balancing windings of the respective movers are connected in series.

The invention is further characterized in that the plurality of movers are of a single configuration.

The invention is further characterized in that connecting terminals are provided on front ends and rear ends of the movers, and multilayered winding terminals of a rear-end terminal in a final mover are short-circuited with each other (i.e., a neutral-point processing is applied thereto).

The invention is further characterized in that, in a condition where the number of phases of each of the plurality of movers is set to three and the number of movers is set to an integral multiple of three, phases of the respective movers are shifted from each other by 120° or 240° in electrical angle, and connecting terminals on the front ends and rear ends in the respective movers are connected while being shifted by 120° or 240°.

The invention is further characterized in that a thermister is incorporated in each of the plurality of movers; and external terminals are provided on the front and rear ends of each of the movers so as to connect all the thermisters in series.

As described above, by virtue of disposing a plurality of movers on a single stator and connecting the polyphase balancing windings in the movers in series, the present invention provides a serial configuration linear motor which can drive a single moving member.

In addition, by virtue of series connection of the movers, generation of cyclic current in each of the movers, which is generated when the movers are connected in parallel and as a result of slight phase shifts, can be prevented; and an arrangement where linear movers having different thrust capacities are combined is enabled.

DETAILED DESCRIPTION OF THE INVENTION

BEST MODE FOR CARRYING OUT THE INVENTION

Hereinafter, an embodiment of the invention will be described by reference to the drawings.

Figure 1:
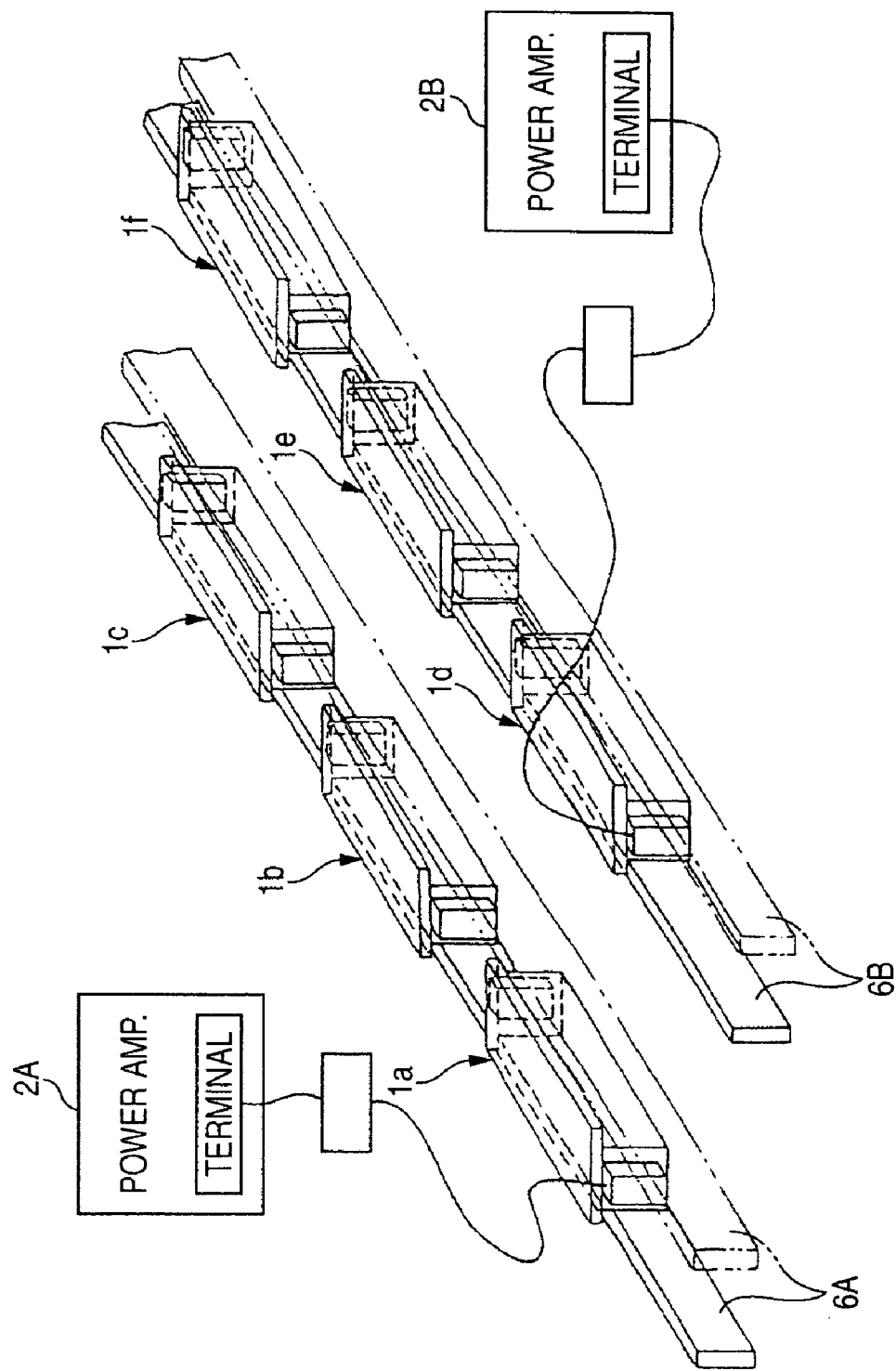
FIG. 1 is a schematic perspective view of a linear motor according to an embodiment of the invention.

FIG. 1 is a schematic perspective view of a linear motor according to the embodiment of the invention.

In the drawing, reference numerals 1a to 1c denote a first linear motor mover group constituted of armatures; 1d to 1f denote a second linear motor mover group constituted of the same; 2A denotes a power amplifier for driving the first linear motor mover group; 2B denotes another power amplifier for driving the second linear motor mover group; 6A denotes a stator where the first linear motor group is placed; and 6B denotes another stator where the second linear motor group is placed.

As shown in the drawing, the linear motor is an example where two mover groups constituted of the first mover group 1a to 1c on the stator 6A, which is on the left side in the drawing, and the second mover group 1d to 1f on the stator 6B, which is on the right side in the drawing, are respectively driven by the two power amplifiers 2A and 2B serving as drivers.

Figure 2:
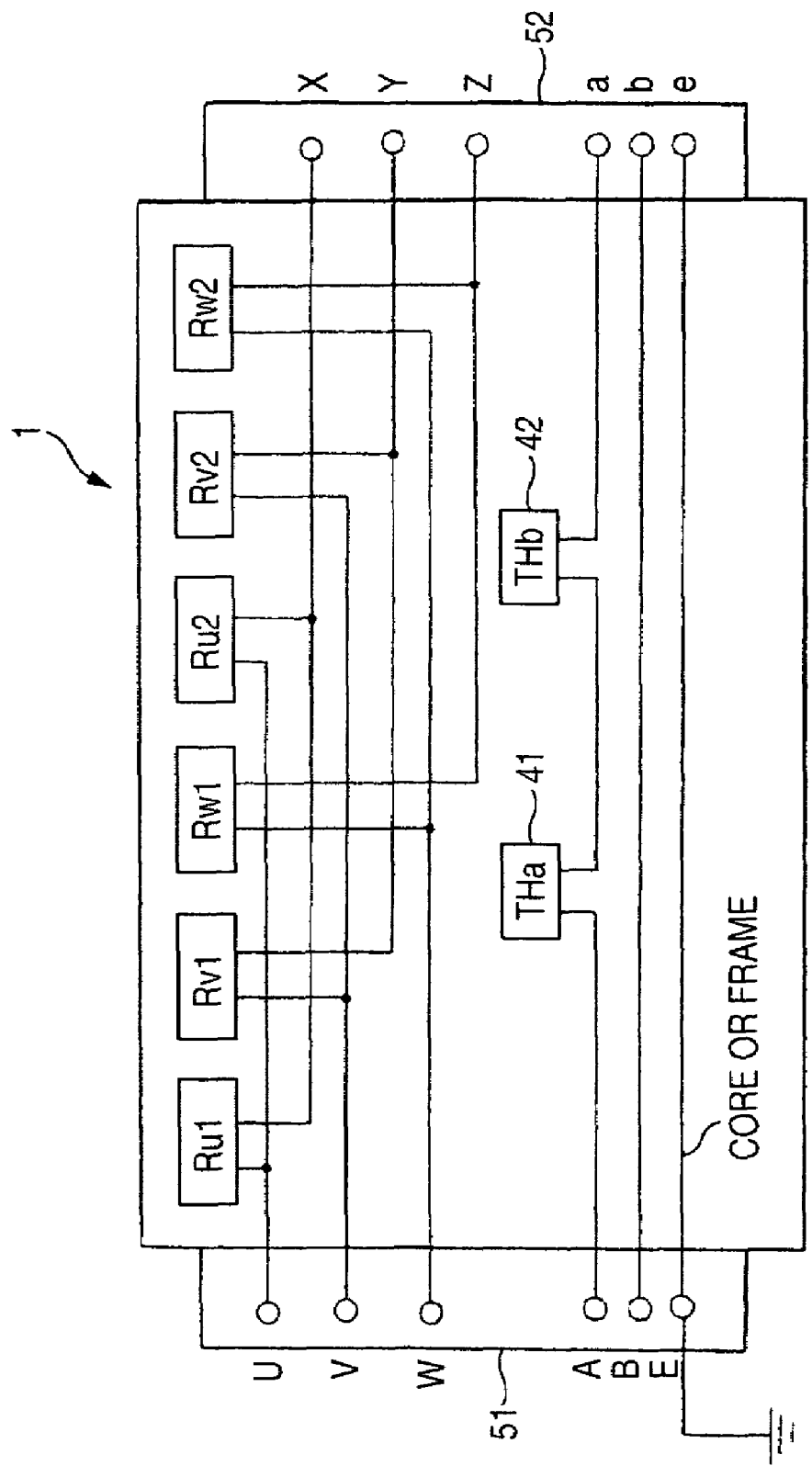
FIG. 2 is an example of connection with regard to three-phase balancing windings applied to each linear mover in a linear motor mover group of FIG. 1.

FIG. 2 is an example of three-phase balancing windings applied to each linear mover in the linear motor mover group of FIG. 1.

The drawing shows that a single linear mover has terminals U, V, and W at a front end (on the left side in the drawing) and terminals X, Y, and Z at a rear end (on the right side in the drawing). Two single-phase coils (RU1, RU2) of the three-phase winding are connected in series between the terminals U and X. Two other single-phase coils (RV1, RV2) of the three-phase winding are connected in series between the terminals V and Y. The remaining two single-phase coils (RW1, RW2) of the three-phase winding are connected in series between the terminals W and Z.

In addition, two thermisters 41 (THa) and 42 (THb) are connected in series between a terminal A on the front end of the single linear mover and a terminal "a" on the rear end thereof. The thermister 41 is disposed between the terminals U and V; and the other thermister 42 is disposed between terminals V and W. Accordingly, the thermisters 41 and 42 detect the respective temperatures.

In addition, a bypass line for the thermisters is also connected between a terminal B on the front end and a terminal "b" on the rear end.

Furthermore, an earth cable connected to an armature core (not shown) is connected between a terminal E on the front end and a terminal "e" on the rear end.

Figure 3:
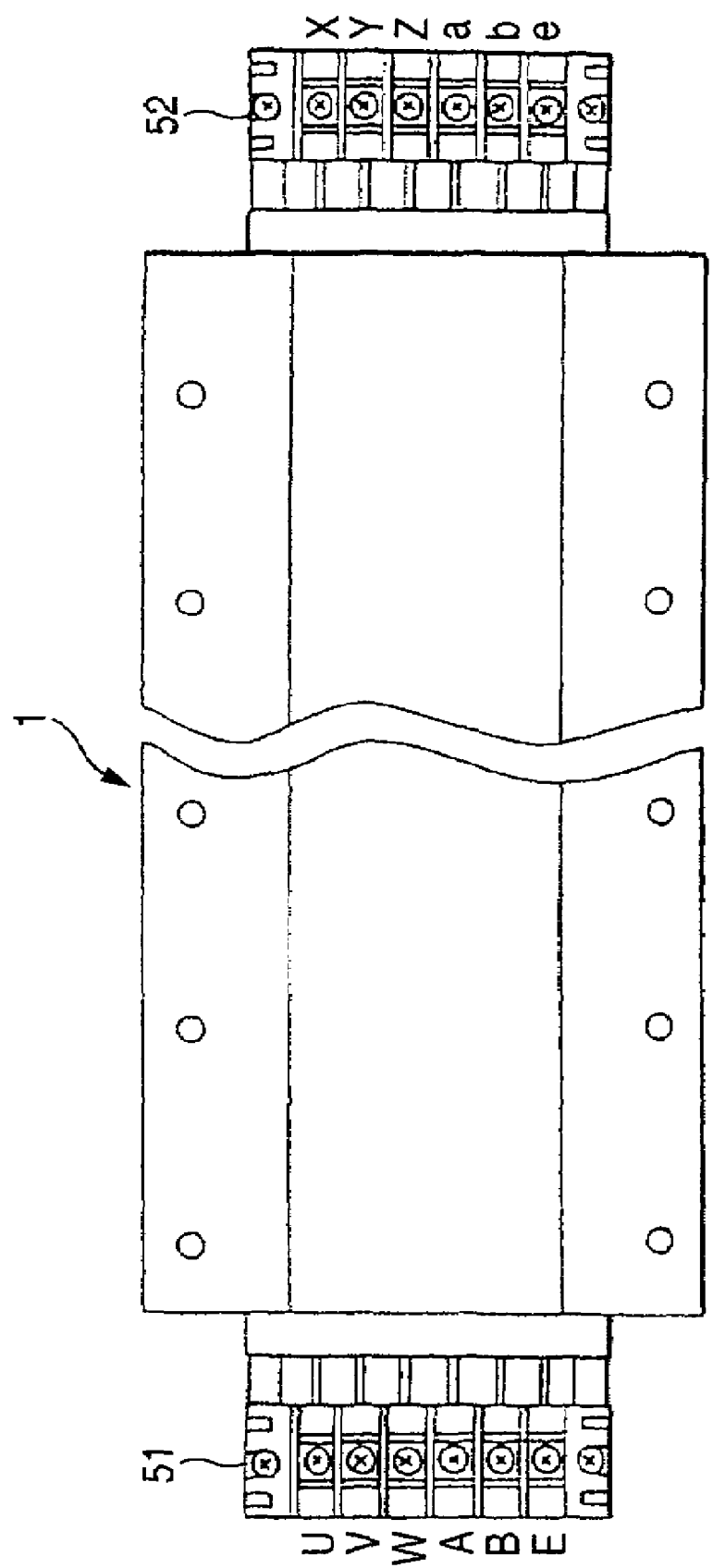
FIG. 3 is a top external view of the linear mover of FIG. 2.

FIG. 3 shows a top external view of the linear mover of FIG. 2.

In the drawing, reference numeral 1 denotes the linear mover as a single article; 51 denotes a front-end terminal (on the left side in the drawing); and 52 denotes a rear-end terminal (on the right side in the drawing).

Within the components, as having described by reference to FIG. 2, two U-phase coils are connected in series between the terminals U and X, two V-phase coils are connected in series between the terminals V and Y, and two W-phase coils are connected in series between the terminals W and Z. In addition, two thermisters are connected in series between the terminals A and "a." A bypass line for the thermisters is connected between the terminals B and "b." An earth cable, connected to the armature core (not shown), is connected between the terminal E on the front end and the terminal "e" on the rear end.

Figure 4:
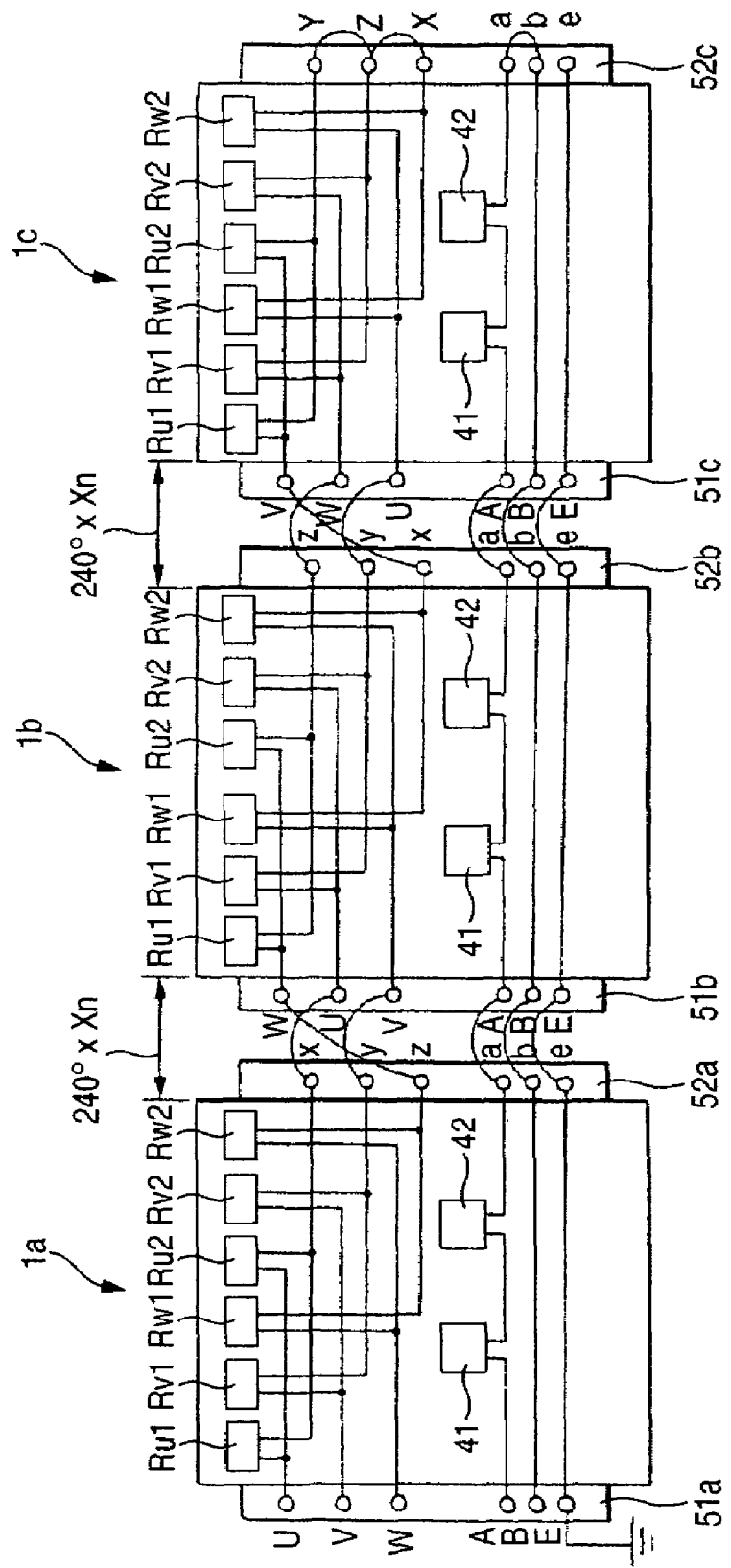
FIG. 4 is a diagram showing a connection relationship between movers in a case where three movers of FIG. 2 are connected in series.

FIG. 4 shows a relationship in connection between movers in a case where three movers of FIG. 2 are connected in series.

The respective movers 1a to 1c are disposed so as to be offset by an electrical angle "n," which is an integral multiple of 240° therebetween.

Power is fed from the outside to the terminals U, V, and W of the front-end terminal 51a in the mover 1a on the front end.

Within the mover 1a, as having been described by reference to FIG. 2, the terminal U is connected to the terminal X of the rear-end terminal 52a by way of the phase coils Ru1 and Ru2 connected in series. The terminal V is connected to the terminal Y of the rear-end terminal 52a by way of the phase coils Rv1 and Rv2 connected in series. The terminal W is connected to the terminal Z of the rear-end terminal 52a by way of the phase coils Rw1 and Rw2 connected in series.

Next, the terminals X, Y, and Z of the rear-end terminal 52a in the mover 1a are respectively connected to the terminals U, V, and W of the front-end terminal 51b in the subsequent mover 1b. However, within the mover 1b, the terminal U is not connected to the phase coils Ru1 and Ru2, to which the terminal U in the mover 1a is connected; instead, the terminal U in the mover 1b is connected to the terminal X of the rear-end terminal 52b by way of the phase coils Rv1 and Rv2, which are adjacent to the phase coils Ru1 and Ru2 and shifted by 120° in electrical angle therefrom. Similarly, the terminal V is connected to the terminal Y of the rear-end terminal 52b by way of the phase coils Rw1 and Rw2, which are adjacent to the phase coils Rv1 and Rv2 and shifted by 120°. therefrom; and the terminal W is connected to the terminal Z of the rear-end terminal 52b by way of the phase coils Ru1 and Ru2, which are adjacent to the phase coils Rw1 and Rw2 and shifted by 120° therefrom.

The terminals X, Y, and Z of the rear-end terminal 52b in the mover 1b are respectively connected to the terminals U, V, and W of the front-end terminal 51c in the subsequent@ mover 1c. However, within the mover 1c, the terminal U is not connected to the phase coils Rv1 and Rv2, to which the terminal U in the mover 1b is connected; instead, the terminal U in the mover 1c is connected to the terminal X of the rear-end terminal 52c by way of the phase coils Rw1 and Rw2, which are adjacent thereto and shifted by 120° in electrical angle therefrom. Similarly, the terminal V is connected to the terminal Y of the rear-end terminal 52c by way of the phase coils Ru1 and Ru2, which are adjacent to the phase coils Rw1 and Rw2 and shifted by 120° therefrom; and the terminal W is connected to the terminal Z of the rear-end terminal 52c by way of the phase coils Rv1 and Rv2, which are adjacent to the phase coils Ru1 and Ru2 and shifted by 120° therefrom.

As described above, orders among the phases Ru, Rv, and Rw of the respective phase windings in the movers 1a to 1c are connected by way of connecting lines such that, when the order in the first mover 1a is Ru-Rv-Rw, that in the second mover 1b is Rw-Ru-Rv and that in the third mover 1c is Rv-Rw-Ru.

The terminals X, Y, and Z of the rear-end terminal 52c in the third mover 1c, which serves as the final mover, are short-circuited, thereby forming a neutral point.

Furthermore, terminals on the front and rear of the respective thermisters in the movers 1a to 1c are also connected respectively, and the terminals "a" and "b" of the third mover 1c, which serves as the terminal mover, are short-circuited. Consequently, all the thermisters are connected in series.

Accordingly, even when an anomalous temperature arises in any one of the phase windings in any one of the movers, the anomaly can be detected appropriately and the mover can be thermally protected.

As described above, by means of disposing and connecting the respective movers 1a to 1c so as to be offset by an electrical angle "n," which is an integral multiple of 240° (or 120°), therebetween, cogging force can be cancelled.

Figure 5:
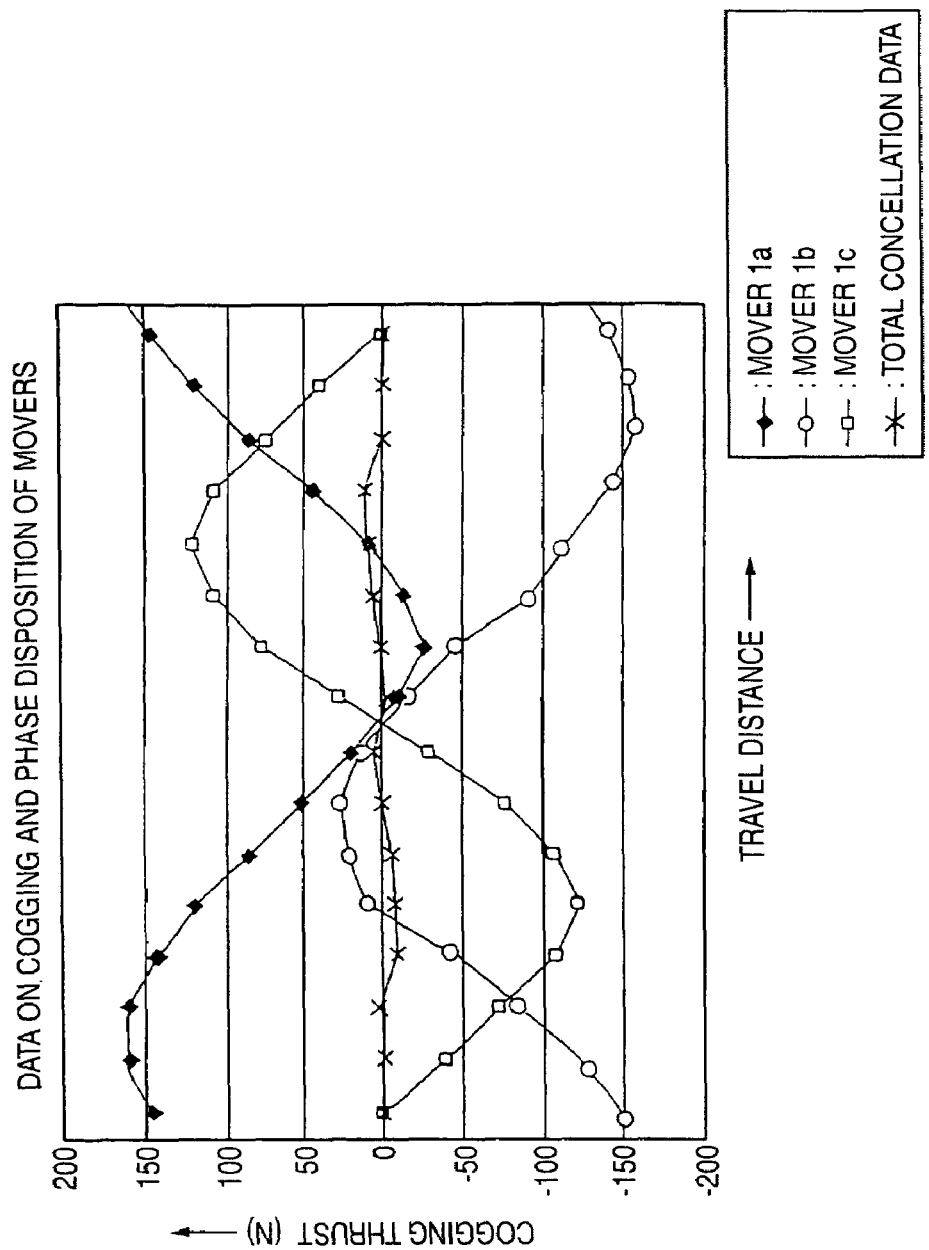
FIG. 5 is a view showing a relationship between cogging thrust and cogging cancellation of the movers.
Figure 6:
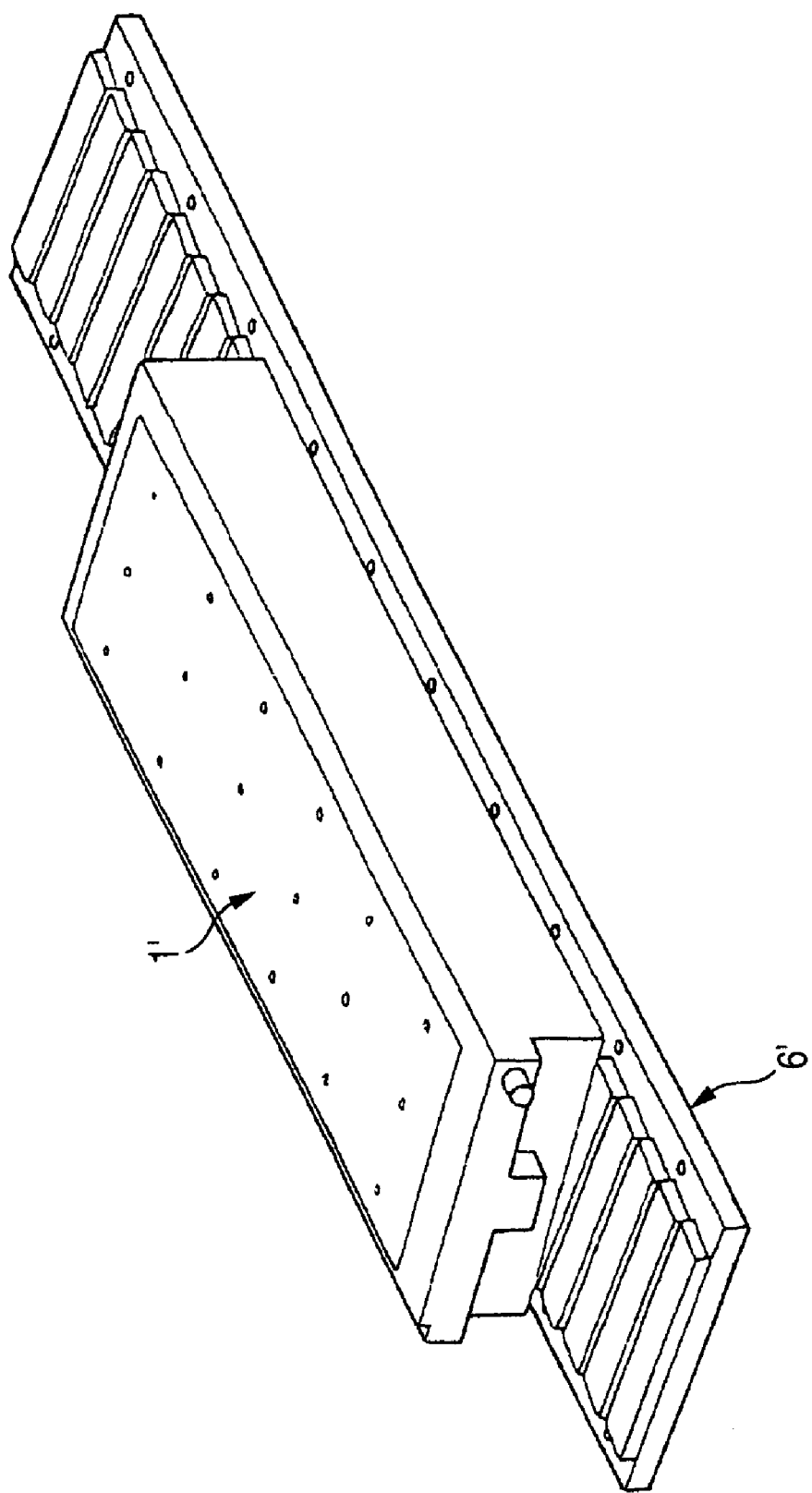
FIG. 6 is a perspective external view of a related-art linear motor.

FIG. 5 is a view showing a relationship between cogging force and travel distance in cogging cancellation.

In the drawing, the vertical axis indicates cogging thrust (N), and the horizontal axis indicates travel distance.

For instance, cogging thrusts by the movers 1a to 1c shown in FIG. 1 are such that magnetic circuit imbalance between the front-end and rear-end terminals generates cogging thrusts of sine curves which are respectively shifted in terms of phases and along the horizontal axis.

However, as described by reference to FIG. 4, when the phases of the respective movers 1a to 1c are shifted by 240°, the respective cogging thrusts cancel each other. Accordingly, as shown in data on total cancellation of FIG. 5, the variation can be suppressed to a small value.

INDUSTRIAL APPLICABILITY

As described above, the serial configuration linear motor according to the invention is advantageous as a device for, for instance, driving a single moving member by means of a plurality of linear motor movers.

The invention claimed is:

1. A serial configuration linear motor constituted of a plurality of movers each formed from an armature having a polyphase balancing winding, and a stator having a permanent magnet or a secondary conductor; wherein the plurality of movers are disposed so as to face each other with a gap therebetween on the stator, and the polyphase balancing windings in the respective movers are connected in series, wherein the plurality of movers are not connected via a spacer, and connecting terminals are provided on front ends and rear ends of the movers, and multilayered winding terminals of a rear-end terminal in a final mover are short-circuited with each other, wherein respective thermisters is incorporated in each of the plurality of movers, and external terminals are disposed on the connecting terminals provided on the front ends and rear ends of each of the movers so as to connect all of the respective thermisters in series.

2. The serial configuration linear motor according to claim 1, wherein the plurality of movers are of a single configuration.

3. The serial configuration linear motor according to claim 1 or 2, wherein, in a condition where the number of phases of each of the plurality of movers is set to three phases and the number of movers is set to an integral multiple of three, phases of the respective movers are shifted from each other by 120° or 240° in electrical angle, and connecting terminals on the front ends and rear ends of the respective movers are connected while being shifted by 120° or 240°.

* * * * *